Feb. 15, 1938.  W. G. SCHILLING  2,108,728
ARTIFICIAL FISHING BAIT
Filed March 2, 1936

INVENTOR.
Willard G. Schilling
BY
Wood & Wood
ATTORNEYS

Patented Feb. 15, 1938

2,108,728

UNITED STATES PATENT OFFICE 2,108,728

ARTIFICIAL FISHING BAIT

Willard G. Schilling, Lima, Ohio, assignor to The Weezel Bait Company, Cincinnati, Ohio, a corporation of Ohio Application March 2, 1936, Serial No. 66,548

9 Claims. (Cl. 43—42)

This invention relates to fishing equipment, and is particularly directed to an artificial bait or lure adaptable for casting or trolling.

It is an object of the present invention to provide an improved artificial fishing bait or lure which greatly resembles a minnow, particularly when moved through the water, that is to say, accurately simulates the natural movements of a minnow, including for this purpose a novel arrangement of feathers or their equivalents.

It is a further object of this invention to provide a feathered bait or lure of this character, in which, structure is incorporated for greatly accentuating the movement of the feathers by permitting the water to flow freely around and within the feathers, thereby causing a fluttering, pulsating or dilating action of the feathers, graphically representative of the breathing of the minnow and its fin action.

It is a still further object of this invention to provide a bait which is of strong durable construction and is easily assembled, the parts of which will not become separated if undue longitudinal strains occur, as when a large fish is on the hook or the hook is snagged on a rock.

It is a still further object of this invention to provide a highly efficient structure for the head element of the bait, whereby certain of the feathers are conveniently and readily attached in relation to the head and hook.

It is a further object to provide an improved arrangement wherein the hook is readily replaceable, in the event that it is broken, without disturbing the mounting of the feathers or necessitating their replacement.

Other objects and further advantages will be more fully apparent from a description of the accompanying drawing, in which.

Figure 1:
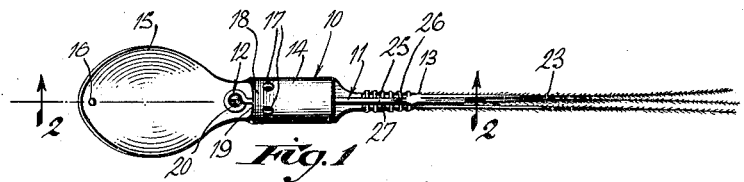
Figure 1 is a top plan view of the improved bait, showing it previous to the attachment of the outer hackle or group of feathers.

The artificial bait or lure, as disclosed in the drawing, is mainly inclusive of a head and feathers or the like. The head of the bait is indicated at 10. The hook 11 has its eyelet end 12 attached to the head and its hook portion 13 extended rearwardly. For the purpose of one feature of the present invention, the head is disclosed as of hollow construction. For this purpose it may be in the form of a tube as indicated at 14, either having its front end partially closed as shown in the main views, or its front end entirely open as shown in the modified views.

In one form of the bait, a spoon shaped deflector plate 15 may extend forwardly as an integral part of the tube. The spoon or plate portion is concave when observed from the top of the bait, and is inclined upwardly. It includes an aperture 16 at its forward end for attachment of the fishing line thereto.

For the purpose of simulating the head of the minnow, apertures may be provided representative of the minnow's eyes as at 17. The forward wall 18 of the tube may be bent downwardly in a curved form, stopping short of the base wall of the tube, leaving a slot 19 which is representative of the mouth of the minnow. This slot or mouth portion also provides clearance for attachment of the hook.

Attachment of the hook is just forward of the mouth portion by means of a screw 20 extending through the eyelet and into the base wall of the bait. The shank of the hook therefore lies along the base wall interiorly thereof, and the barb end turns upwardly. If desired, the forward end of the tube may be left open as at 21 (see Figures 4, 5 and 6), the eyes being similated in this form by means of apertures 22 as in the preceding form.

Figure 2:
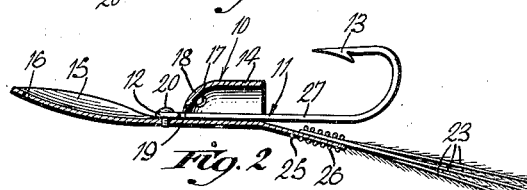
Figure 2 is a sectional view taken on line 2—2, Fig. 1, illustrating the attachment of the hackle of tail feathers to an extension of the head and previous to bending the same into normal position of use.
Figure 3:
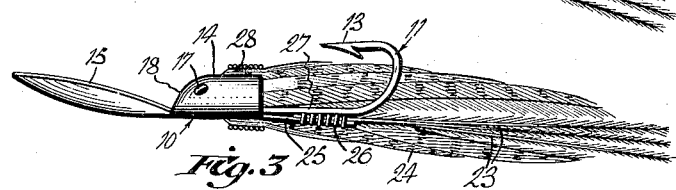
Figure 3 is a side elevation of the complete bait with the outer layer of feathers shown in section so as to disclose the interior construction of the bait.

The feather arrangement on the bait is as follows: A hackle of tail feathers 23 is attached within an outer hackle of body feathers 24, the latter feathers being shorter than the tail feathers, that is to say, the tail feathers extend beyond the body feathers. The tail feathers are attached to an extension 25 of the head independently of the hook. Describing one embodiment of this feature of the invention, the extension 25 may be provided from the base wall of the tubular head. The head element may be formed of copper or some ductile metal so that the extension is readily bendable as shown in Figures 2 and 3.

The hackle of tail feathers is secured to the rearward extension 25 by means of thread, twine, wire 26, or any other suitable means. The assembly operation is facilitated by bending the extension downwardly out of contact with the hook so that the wrapping can be done efficiently and easily. When it is completed, the extension is bent up against the hook as shown in Figure 3, thus disposing the hackle of tail feathers in longitudinal alignment with the shank 27 of the hook and the head of the bait.

The outer group of feathers which constitutes the body is arranged in a layer around the neck portion of the head. The quill ends of these feathers are attached to the head by means of thread, twine, wire 28, or any other means. The layer of feathers arranged in this manner, that is, in a circumferential arrangement provides a tubular space as a continuation of the head.

Figure 4:
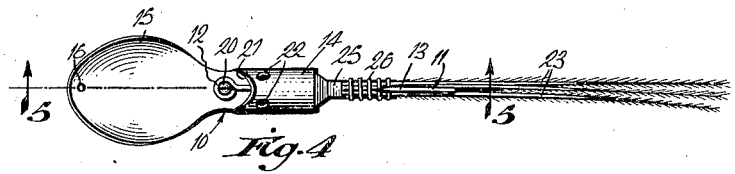
Figure 4 is a top plan view of a modified form of the bait prior to the attachment of the outer layer of feathers.
Figure 5:
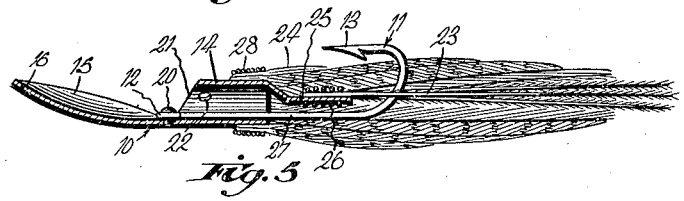
Figure 5 is a longitudinal sectional view taken on line 5—5, Fig. 4, illustrating the details of the attachment of the feathers and showing their relation to the hook and head.

The extension for the purpose of attaching the tail feathers may be formed from the upper wall of the tube as shown in Figures 4 and 5. In this case the extension or spur 25 is bent downwardly and rearwardly so as to dispose the attachment portion thereof in axial alignment with the head for substantial clearance between the respective hackles of feathers.

When a tubular head is used, as specifically shown, the water is free to flow through the tube passing through the mouth and eye openings in the form shown in Figures 1 to 3, and thence through the annular space and out the rear end of the bait. With the water flowing through the inside as well as along the outside of the feathers, it is obvious that considerable movement will ensue, which movement can be even more accentuated by the use of a spinner device, as hereinafter described.

It will be appreciated that the independent attachment of the tail feathers is a distinct advantage whether employed in conjunction with the feature of having the water flow through the head or otherwise, since it is more convenient to attach the tail feathers to means other than the hook, and since the attachment portion of the head can be disposed in any manner desirable for the proper location of the tail feathers.

The spoon or plate extension functions to elevate the bait in the water. The depth to which the bait will sink as it is drawn through the water is determined by the speed at which the bait is drawn through the water. A very rapid motion will tend to bring it close to the surface. The deflector plate or spoon portion therefore may be described as having an elevating effect on the bait when in use.

The action of the bait as drawn through the water is sinuous, that is to say, the bait weaves back and forth laterally as a result of the pressure on the inclined plate or spoon against the water. In other words, the plate elevates the bait or lure, tending to keep it fairly close to the surface. It will be appreciated that the bait has some weight due to the use of metal for the purpose of the plate and head, and would sink deep in the water if it were not for the elevating effect produced by the plate.

Figure 6:
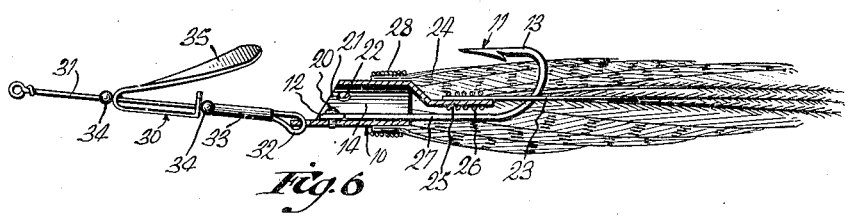
Figure 6 is a view taken similar to Figure 5, but illustrating a whirling or spinner device disposed in front of the bait in place of the deflector plate shown in the previous views.

If desirable, means may be incorporated in front of the bait for the purpose of further increasing the movement of the feathers. For this purpose a spinner device 30, disclosed in Figure 6, is attached to an apertured portion or extension at the forward end of the bait in place of the deflector plate portion.

A leader 31 forms the rotative or axial support for the spinner device. The wire length constituting the leader has one end bent to provide an eyelet 32 in the end thereof, the support terminal being reversely bent to lie along the length of the leader. A sleeve or tube 33, slidably mounted on the leader, is slipped over the extended end thereof for locking the eyelet in position on the fixed eyelet of the tube. The spinner device is mounted on the leader between balls 34, 34, which facilitate rotation thereof.

The spinner is formed of a strip of metal. Its mounted portion is of U-shape with the leader passing through the arms thereof. The forward arm is extended rearwardly in an arc to form a vane 35. The vane is twisted slightly laterally to provide a structure which will whirl or rotate as the spinner is drawn through the water. This spinner device beside creating light flashes which attract the fish, being the conventional use of the spinner device, causes an additional whirling action of the water about the bait. This disturbance of the water is effective on the feathers for causing dilation of the circumferentially arranged group.

The action of the feathers which may be described as fluttering, quivering or pulsating, makes the bait appear to be alive in a true simulation of the minnow since the effect is that of breathing and fin movement.

Having described my invention, I claim:

1. A lure for the purpose described, comprising, a head element including a forwardly and upwardly projected plate, a hook removably secured to said head element and having its hook end extended rearwardly therefrom, said head element including a rearward extension disposed within a continuation of the circumferential outline of the head element, a hackle of tail feathers having their quill ends secured to the rearward extension, and a hackle of feathers of shorter length than the first hackle having their quill ends secured to the head element and disposed around the same for forming a cylindrical arrangement of feathers providing a tubular space.

2. A fish lure, comprising, a head element having a plate portion extending forwardly and upwardly therefrom, a hook having its eyelet end secured in the head element and its hook portion extending rearwardly from the head element, said head element incorporating a rearward plate extension, tail feathers having their quill ends secured to the rearward plate extension, and short feathers having their quill ends secured to the head element and distributed around the same, said short feathers providing an annular space permitting water circulation therethrough and free movement of the short feathers for the purpose of similating the movements of a minnow.

3. An artificial bait, comprising, a tubular head element having a rigidly attached forwardly upwardly extended plate portion of spoon form thereon, a hook secured in said head element and having its hook end extended rearwardly from the head element, said tubular head element having openings in its forward end representative of the eyes and mouth of a minnow, feathers secured around the head element and extending rearwardly around the shank of the hook forming a tubular space extending from the tubular head element, whereby the water passes through the eye and mouth openings and imparts lifelike movement to the tubularly arranged feathers.

4. An artificial bait, comprising, a tubular head element, a hook secured in said head element and having its hook end extended rearwardly from the head element, said tubular head element having openings in its forward end representative of the eyes and mouth of a minnow, feathers secured around the head element and extending rearwardly around the shank of the hook forming a tubular space extending from the tubular head element, whereby the water passes through the eye and mouth openings and imparts life-like movement to the tubularly arranged feathers.

5. A fish lure, comprising, a hollow head element having its rear end open and its forward end inclusive of eye and mouth openings, a hook associated with said head element having its eyelet end removably attached to the head element, the hook portion extending rearwardly from within the head element, and a group of feathers secured around the head element and the shank of the hook, whereby the water may pass through the eye and mouth openings through the head element and through the feathers for the purpose of causing movement of the feathers.

6. A fish lure, comprising, a tubular head element having eye and mouth openings at its forward end and open at its rear end, a hook attached to said tubular head element and having its hook portion extending rearwardly, a hook extending rearwardly from the head element coaxially therewith, a group of tail feathers having their quill ends attached to said hook, a second group of feathers having their quill ends attached to the head element and distributed around the same, said latter feathers completely surrounding the first group of feathers and providing a tubular space as a continuation of the space within the tubular head element, whereby the water can flow through the eye and mouth openings and through the space within the feathers for the purpose of activating the same.

7. A lure for the purpose described, comprising, a head element, a hook secured to said head element and having its hook end extended rearwardly therefrom, said head element including a rearwardly extending finger disposed within an extension of the circumferential outline of the head element, a hackle of tail feathers having their quill ends secured to the rearwardly extending finger, and a hackle of feathers of shorter length than the first hackle having their quill ends secured to the head element and disposed around the same for forming a cylindrical arrangement of feathers providing a tubular space.

8. A lure for the purpose described, comprising, a head element including a forwardly and upwardly projected plate, a hook secured to said head element and having its hook end extended rearwardly therefrom, said head element including a rearward extension disposed within the plane of the head element, a hackle of tail feathers having their quill ends secured to the rearward extension, and a hackle of feathers having their quill ends secured to the head element and disposed around the same for forming a cylindrical arrangement of feathers.

9. An artificial bait comprising a hollow head element, a hook secured in said head element and having its hook end extended rearwardly from the head element, a finger extended rearwardly from said head element substantially coaxially thereof, a group of long tail feathers secured to said rearwardly extending finger, and a second group of feathers, shorter than the first, distributed around the tubular head element and attached thereto, said first mentioned group of feathers extending rearwardly beyond the second group of feathers.

WILLARD G. SCHILLING.